TELEVISION IMAGE SUPER-IMPOSITION
Filed April 23, 1948
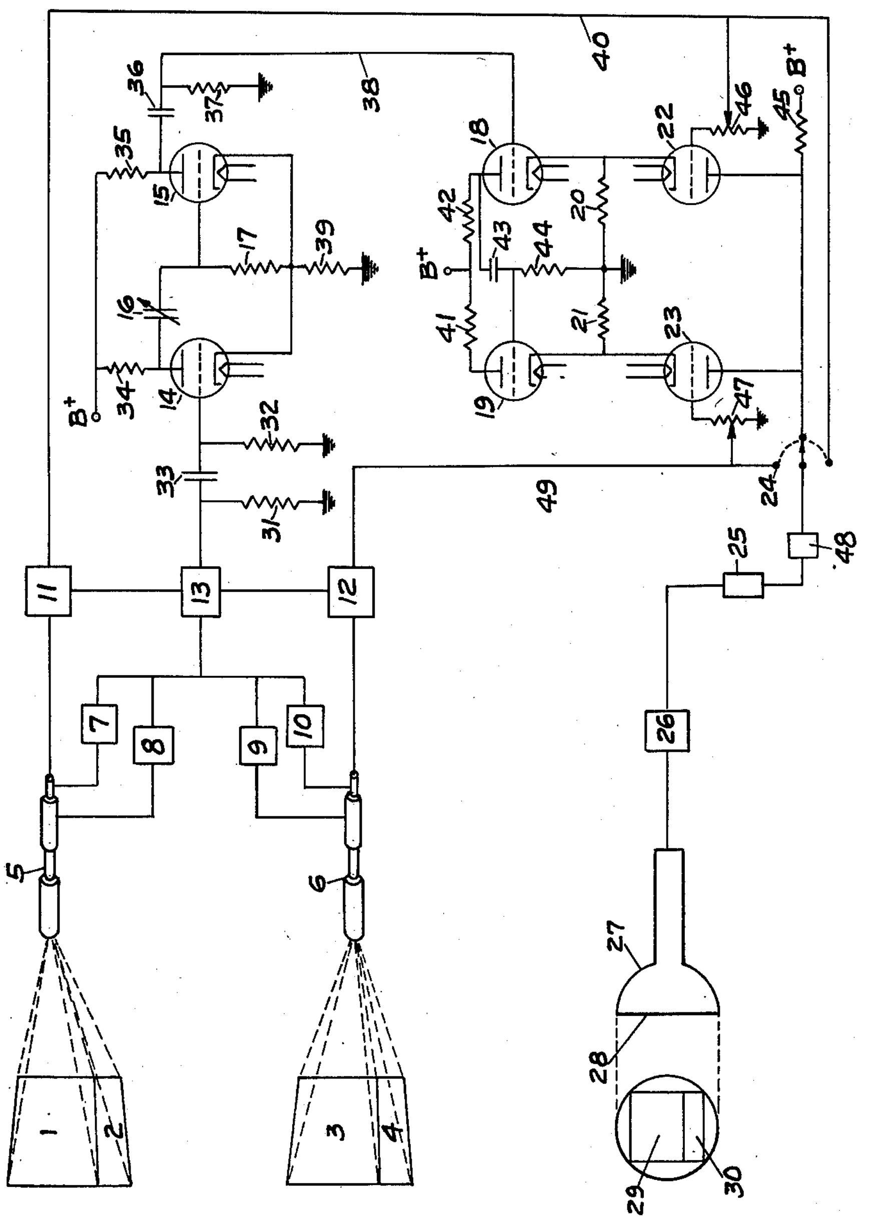
INVENTOR.
DAVID P. PERRY
BY A. D. T. Libby
attorney Patented Sept. 18, 1951

2,568,166

UNITED STATES PATENT OFFICE 2,568,166

TELEVISION IMAGE SUPERIMPOSITION

David Phillips Perry, Maplewood, N. J.

Application April 23, 1948, Serial No. 22,749

4 Claims. (Cl. 178—6.8)

This invention relates to an electrical system especially adapted for use in television work. It is one of the objects of the invention to provide a system which will allow at least two different images to be produced simultaneously on a television receiver screen without any interference one with the other, for example suppose an opera in which a foreign language was being used in whole or part was being televised, an English translation of the words used or a commentary on the subject could be shown on a part of the screen without disturbing the opera scene per se.

A further object is to provide a system wherein the two images may be made to take up different areas on the screen.

Another object is to provide an electronic system which will attain the objects mentioned, and others that may occur to one skilled in these matters, at a reasonable cost.

In the drawing which shows diagrammatically the system, the areas 1, 2 and 3, 4 illustrate areas that are to be televised by an image orthicon or equivalent tubes 5 and 6, each of which has its own vertical 8 and 9 and horizontal 7 and 10 controls as well as a blanking pulse generator may be used if desired. These images tubes or others that may be added are all synchronized by a pulse generator 13 to which is connected the video amplifiers 11 and 12, that are also connected by leads 40 and 49 to contacts of switch 24 to which reference will be later made. After leaving the pulse generator 13 the signals are transmitted through the condenser 33 to the grid of tube 14 forming, with tube 15 and associated resistances 31, 32, 34, 35, 17, 39 and condenser 16 interconnected as shown, what is usually termed a "flip-flop" circuit. The length of these pulses or signals can be adjusted in a well known manner and when at the proper length and positive in direction they are impressed on the grid of tube 14 which is normally non-conducting but when a positive pulse reaches the grid of tube 14 it starts to conduct for a length of time corresponding to the length of the said pulse. The tube 15 is normally conducting and as soon as current starts to flow from source B through resistance 34 and tube 14, the grid of tube 15 receives a pulse which stops the tube 15 from conducting. As soon as current starts to flow through the plate circuit of tube 14, the charge on the adjustable condenser 16 is changed from B to whatever voltage is caused by the drop of potential across the resistor 34. This causes the grid of tube 15 to become more negative, thus bringing the bias on tube 15 beyond the cut-off point; hence the tube 15 will not conduct as long as the charge remains on condenser 16, which will be only as long as the said pulse. When the pulse ends the charge on condenser 16 will leak off by way of resistences 17, 39 if that be used, and 34. It is to be understood that resistance 17 is great enough to prevent the condenser 16 from discharging immediately so tube 15 will continue to be cut-off for a time after tube 14 stops conducting, this time being determined by the values of condenser 16 and resistor 17. It may be noted here that the resistors 34 and 35 act to keep the voltage changes caused by a charge on the plate of tube 14, from directly affecting the signal going to tube 18.

This positive pulse on the plate of tube 15 transmitted through lead 38 to the grid of tube 18 causes 18 to conduct. When the tube 18 conducts, the voltage on the common cathode resistor 20 rises from ground potential past the cut-off voltage and hence cuts off the tube 22. While the tube 22 is cut off, the video signal from the amplifier 11 cannot be amplified by tube 22 and sent to the receiver 26 by means of the radio link 25; hence the area 2 does not at this time transmit any image to the receiver 26, if we assume that the sweep circuit is scanning the image from area 2 to area 1. When the tube 18 conducts it causes a negative pulse to be impressed on the grid of tube 19, which prevents this tube from conducting and this makes the grid of tube 23 more positive than its cathode and tube 23 will conduit and when this takes place the signal or pulses from the video amplifier 12 is amplified by tube 23 and sent to the receiver 26 via the radio relay link 25. The signal is thus passed through the tube 23 when the time pulse is negative, so the images in area 4 are transmitted and appear on the picture screen 28 of tube 27 at the lower portion 30 thereof.

After the negative going pulse from tube 14 has leaked through the grid resistor 17 of tube 15, this tube begins to conduct again and the grid of tube 18 becomes negative which cuts it off. When tube 15 is non-conducting the voltage drop across cathode resistor 20 decreases making the cathode of tube more negative and the bias on tube 22 is decreased thereby permitting tube 22 to conduct and when this happens the signal from video amplifier 11 is amplified and passed through tube 22 to the line amplifier 48 and on through the radio relay 25 to the television receiver 26 and to picture screen 28. In this manner the signal is taken from the image tube 5 at the time when the image in the top area is being scanned and the image or video signal is switched into the line amplifier 48 by switching tube 22. At the same time the corresponding area 3 viewed by the lower image tube 6 is switched off by tube 23 so the area 1 becomes the image 29 in the upper part of the tube 27. From this it will be seen that 1 and 4 combine to form images 29 and 30 while images in areas 2 and 3 are switched out and vice versa.

In addition to serving as a method of dividing or fitting together two separate image tubes this system can be used to switch the images gradually from one tube to the other by adjusting the elements of the "flip-flop" circuit, such as condenser 16 and resistor 17, it being understood that the resistor 39 may not be used. It may be noted that the elements 16 and 17 may be so adjusted that the areas 29 and 30 on the screen 28 can be varied so either can be made to take up all the screen area. To perform this function with a greater range, one or more "flip-flop" circuits may be added to the one shown. It may also be mentioned that the resistor 31 may or may not be used and if the resistor 32 and condenser 33 are used, the resistor 32 acts to prevent electrons from collecting on the grid of tube 14 which would interfere with its function, while the condenser 33 acts to keep a high potential off said grid. The elements 31, 32 and 33 might be included in the pulse generator 13. The resistors 41, 42 and 45 are plate loads which I have found advisable to use. The resistors 46 and 47 function similarly to resistor 32.

Condenser 26 acts to keep B off the grid of tube 18 via lead 38 but allows the signal to pass thru, while the resistor 37 prevents electrons from collecting on said grid. Condenser 43 and resistor 44 perform similar functions for tube 19 and resistors 46 and 47 act, the same as 37, for tubes 22 and 23 and also serve to adjust the strength of the signals coming from the video amplifiers 11 and 12 to contacts of switch 24 that acts to connect 11 or 12 directly to the amplifier 48 and on to the receiver 26 and tube 27. The amplifier 48 is a unit which may be used to prepare, if necessary, the signal, coming from the switching tubes 22 and 23; for its introduction to the link 25 which is the means for sending the television signal from the sending station to the receiving section, while the receiver 26 is a unit which takes the transmitted signal and puts it onto the picture tube 27. In the claims I designate the tubes 18 and 19 with their interconnecting elements as, a triggered multivibrator circuit and the tubes 22 and 23 with their interconnections as, a switching circuit.

Having thus described my invention, what I claim is:

1. In an electronic system for television use, two television tubes for scanning areas to be televised, the output terminals of the tubes being connected to video amplifiers, a synchronizing circuit associated with the amplifiers, a television receiver tube having a screen to receive a composite image, means for utilizing image impulses from said amplifiers whereby said impulses can be combined so as to form said composite image, said means including a flip-flop circuit the input side being connected directly to said synchronizing circuit, a triggered multivibrator circuit connected to the output of the flip-flop circuit, said multivibrator circuit having a pair of interconnected tubes, the plates of which are directly connected by resistors connected together and to a source of positive potential at their point of union, the grid of one being connected to the output of the flip-flop circuit while the grid of the other tube is connected to the plate of the first tube through a condenser and also connected through a resistor to ground and the cathodes of said pair of tubes are directly connected by resistors connected together and to ground at their point of union, a switching circuit having a pair of tubes with their cathodes directly connected one each to the cathodes of the pair of tubes in the multivibrator circuit, as well as to said directly connected resistors that connect the cathodes of the multivibrator circuit at the cathode ends of said resistors, the plates of the switching tubes being connected through to the television receiver tube, while the grid of the switching tube, that has its cathode connected to the cathode of the tube in the multivibrator circuit whose grid is connected to the flip-flop circuit, is connected through an adjustable resistance to one of the scanning tube amplifiers, said adjustable resistance being grounded at one end, the other tube in the switching circuit having its grid connected through an adjustable resistance and to the other scanning tube amplifier, the last mentioned adjustable resistance also being grounded.

2. In an electronic system for television use, a television receiver tube for utilizing images from two television scanning tubes having video amplifiers connected to their output terminals, said amplifiers also being connected to a switch whereby either one may be connected to the television receiver tube and means for combining said images, so as to form the composite image on the screen of said television receiver tube, said means including a synchronizing pulse generator, a flip-flop circuit receiving triggering pulses from said generator, a combination of four tubes connected to the output of the flip-flop circuit, one pair of tubes having their plates joined by a pair of resistors with a source of potential connected at their junction with each other, said tubes having their cathodes joined by a pair of resistors with a circuit connection at the junction of the resistors while the grid of one tube is connected to the output of the flip-flop circuit and the plate of this tube is connected in series through a condenser and resistor to said cathode resistor circuit junction and the grid of the second tube of said first mentioned pair is connected to the junction of said condenser and series resistance, the other pair of tubes having each of their cathodes connected to the cathode of one of said first mentioned pair of tubes while their plates are connected together and to a resistor adapted to be connected to a source of potential, the plates also being connected to an output lead communicating with the television receiver tube, the grids of the second pair of tubes being connected through resistors to said video amplifiers connected to the scanning tubes.

3. An electronic system for television use as set forth in claim 1 further defined in that a switch is provided for switching either scanning tube or the output of the combined multivibrator and switching arrangement, to a sending link for transmission to the television tube.

4. An electronic system for television use as set forth in claim 1 further defined in that a switch is provided for switching either video amplifier output or the output of the said switching hookup, to a sending link for transmission to the television tube.

DAVID PHILLIPS PERRY.

REFERENCES CITED

The following references are of record in the file of this patent:

UNITED STATES PATENTS

| Number | Name | Date |
|---|---|---|
| 2,073,370 | Goldsmith | Mar. 9, 1937 |
| 2,164,297 | Bedford | June 27, 1939 |
| 2,240,420 | Schmitzer | Apr. 29, 1941 |
| 2,244,239 | Blumlein | June 3, 1941 |
| 2,349,687 | Williams | May 23, 1944 |
| 2,399,586 | Toomin | Apr. 30, 1946 |
| 2,464,353 | Smith et al. | Mar. 15, 1949 |
| 2,490,561 | Ussler, Jr. | Dec. 6, 1949 |

OTHER REFERENCES

Radar Electronic Fundamentals by Navships 900,016, p. 194.